April 24, 1962 H. J. MUMMA ET AL 3,031,077
METHOD OF AND APPARATUS FOR DETECTING BLOOD IN EGGS
Filed April 27, 1960 3 Sheets-Sheet 1

FIG_1

INVENTORS
HAROLD J. MUMMA
THOMAS E. ROBERTS, JR.
BY Hans G. Hoffmeister
ATTORNEY

United States Patent Office 3,031,077
Patented Apr. 24, 1962

3,031,077
METHOD OF AND APPARATUS FOR DETECTING BLOOD IN EGGS
Harold J. Mumma, Riverside, and Thomas E. Roberts, Jr., Saratoga, Calif., assignors to FMC Corporation, a corporation of Delaware
Filed Apr. 27, 1960, Ser. No. 24,980
21 Claims. (Cl. 209—111.5)

This invention relates generally to automatic egg candling and more specifically to the detection and elimination of eggs known in the trade as "bloods."

Various proposals have been made for detecting eggs having blood spots therein by an automatic candling method. These proposals include the transmitting of a beam of light having a narrow band frequency range in the order of 575 millimicrons, which band coincides with the hemoglobin absorption band and is strongly absorbed by blood spots in eggs. The automatic candling of eggs for blood spots requires the inspection of eggs of various opacities, and eggs having various shell and yolk colors, which shell colors may range from a clear white to a light brown. Because of color and opacity variations encountered, it has been found necessary to include in the inspection apparatus a reference band of light, which band is not greatly attenuated by the blood spot nor by variations in shell color or opacity. The principle of such a system is that by proper adjustment of the mechanism it should be possible to compare the light transmittance of the hemoglobin band with that of the reference band, and thus discriminate only against eggs that absorb the hemoglobin band and hence contain blood spots. In such a system, the effects of opacity including shell and yolk color variations are ignored, if the machine can be made to operate precisely as intended. However, prior devices of this type become unreliable when applied to a high-speed continuous process.

An object of the present invention is to provide an improved system for detecting blood in eggs.

Another object is to provide an efficient method of testing for blood spots in eggs.

In accordance with the present invention, high speed, reliable inspection is possible because the discriminating apparatus can be precisely adjusted and timed so that only eggs that are bloody will be rejected at the reject station, which is conveniently spaced some distance from the inspection station.

It is also a feature of the present invention that the inspection is exceptionally reliable since the device is insensitive to normal variations in shell and yolk color and to changes in light intensity between inspections, to a degree heretofore unattainable. This advantage results in part from the nature of the optical and electrical components of the system, and in part to the wave length of the reference beam of light.

Another feature of the present invention is that aging of the optical components, such as a slight diminishing of the relative intensities of the inspecting light beams, and slight variations in the filters do not introduce errors that reject good eggs or pass bad eggs.

Still another feature of the invention is that a mechanical light chopper and optical system is employed such that a single inspection light source can be employed. This minimizes the effect of any physical variations that might occur in the light source, due to deterioration of the light source elements with age and long use.

Another feature of the invention is that the timing of the application of a reject signal to the rejecting mechanism is independent of variations in the speed of the motor that drives the conveyor that carries the eggs past the inspection station.

Briefly, these features and advantages are obtained in accordance with the invention by supplying a single light source which transmits beams through a mechanically driven high-speed rotary light chopper that alternately produces the inspection beams, namely a hemoglobin beam of 575 millimicrons and a reference beam of 597 millimicrons. These beams are alternately passed through the egg and are received by a photomultiplier tube which converts the light intensity of the beams into corresponding direct current pulses. When a standard or reference egg is being inspected, the machine is adjusted so that the pulses derived from both beams are equal. The reference or standard egg is one that is non-bloody and is very nearly the most opaque type egg encountered. If the egg color or characteristics are such that the egg is clearer (less opaque) than the standard egg, the absorption of the 597 millimicron reference beam of light is not materially reduced, but the absorption of the 575 millimicron hemoglobin beam may be appreciably reduced, relative to that of the reference beam. Stated differently, with a clearer than standard, non-bloody egg, the intensity of the light received by the photomultiplier tube from the hemoglobin beam is increased somewhat, from that transmitted by the standard egg, whereas the intensity of the light received by the photomultiplier tube from the reference beam is virtually unchanged. Under this condition (clear egg) the alternate electric pulses are no longer equal, but the apparatus is not responsive to this condition. When a bloody egg is being inspected, the absorption of the hemoglobin band increases sharply and transmission to the photomultiplier tube is reduced but again, absorption of the reference beam is unchanged, so that although the pulses are again unequal, now they are unequal in the opposite direction.

Both the signals from a bloody egg and those from an egg clearer than a standard egg have an alternating component, which component has a frequency that is half the frequency of the combined pulses produced by the photomultiplier tube. In accordance with this invention, the half-frequency alternating signal component is sensed by a tuned filter, amplified and applied to a phase inverter. The phase inverter splits the signal into two signals of opposite phase, and these are applied to complementary but oppositely connected sections of a phase-sensitive rectifier in the form of a double diode. The phase-sensitive rectifier is triggered to conduction by impulses received from a phototube or photocell that receives a beam of light directly from the same light chopper that forms the inspection beams. The output of the photocell is converted into a square wave and applied to the phase-sensitive rectifier which conducts in one direction or the other, depending upon the phase of the alternating current inspection signals applied thereto. This produces direct-current pulses that flow in one direction for a bloody egg and in the opposite direction for a clear egg.

These direct-current pulses are applied to a cathode-coupled binary known as the Schmitt trigger circuit, which converts the signals from a bloody egg into a D.C. signal for a reject relay. The reject relay, in turn, transmits a signal to a transfer relay that transfers the reject signal to a memory device. The transfer relay is controlled by a cam that is driven in synchronism with the conveyor that carries the eggs past the inspection station. The reject signal is thus transmitted to the memory device that actuates the rejection mechanism at the rejection station, at exactly the correct time to reject the egg that was previously inspected and found defective. This system is stable, is locked in synchronism, and is independent of normally encountered variations in the speed of the motor that drives the light chopper.

The system is not affected by the presence of non-bloody eggs that are clearer than the standard egg because the Schmitt trigger circuit that controls the reject relay is insensitive to signals resulting from "clear" eggs. The device is not sensitive to variations in egg opacity or shell color. The device employs a chopper and an optical system that facilitates the use of a single light source. Thus there are no variations due to differential aging of multiple light sources giving corresponding changes in light intensity. Changes in light source intensity that might result from voltage variations do not affect the reliability of the system.

ELEMENTS OF THE SYSTEM

Figure 1:
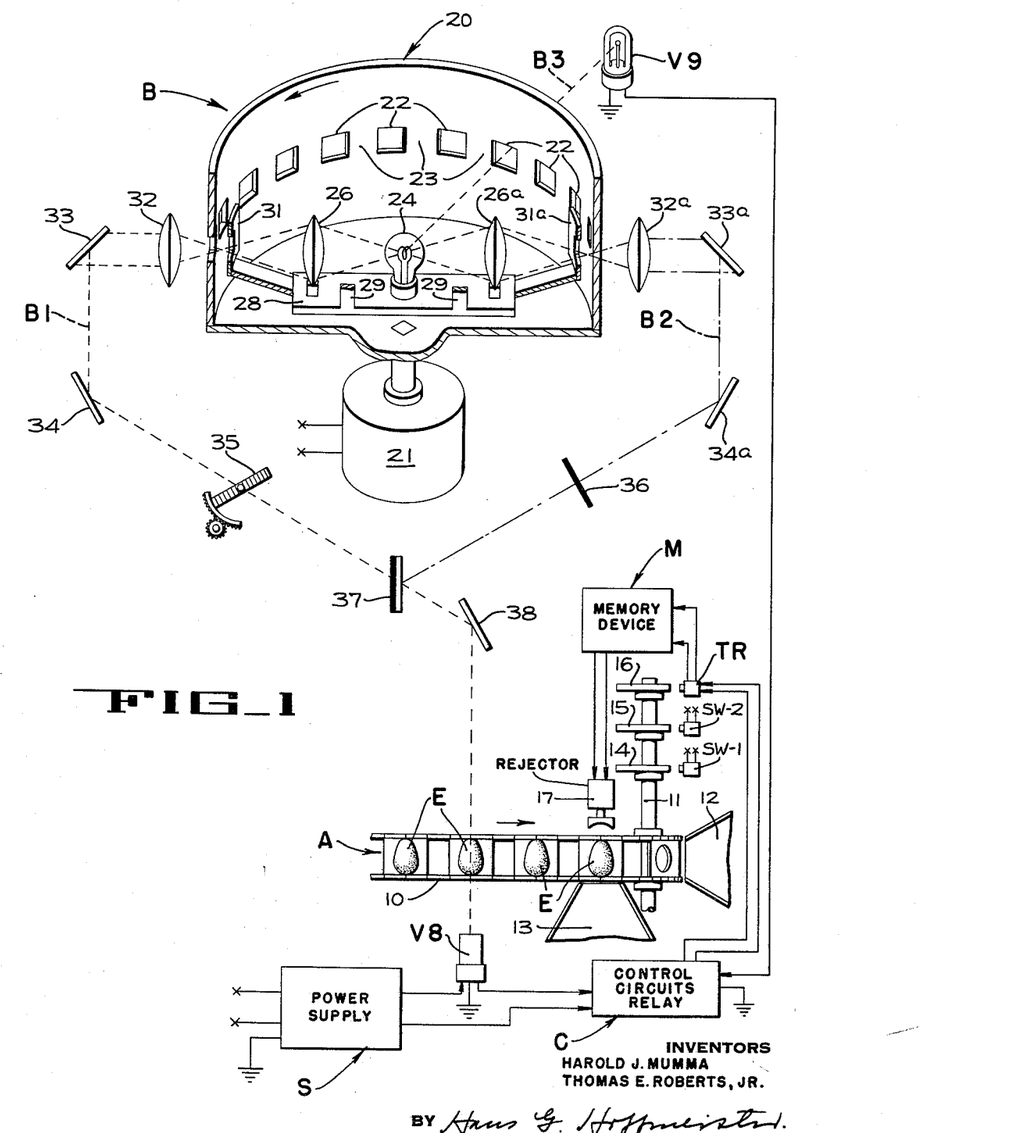
FIGURE 1 illustrates the basic components of the optical system with the electrical system being shown diagrammatically.

Referring to FIGURE 1, the basic elements of the system for inspecting eggs E for blood are a conveyor system A, an optical system B that includes a photomultiplier tube V8 and a phototube or cell V9, a power supply S which is not part of the invention, a control circuit and relay assembly C, and a memory device M, the details of which are not part of the invention.

The conveyor assembly A includes a conveyor chain 10, formed with means for continuously suspporting and carrying eggs past the inspection station directly opposite the photomultiplier tube. A suitable conveyor system is illustrated in FIGURES 21, 78-81 and described in the patent to Mumma No. 2,895,274. The conveyor system A is illustrated diagrammatically in FIGURE 1 and is driven by suitable power means including a driving shaft 11, driven by a motor (not shown). Means indicated diagrammatically at 12 are provided for receiving accepted eggs, and means indicated diagrammatically at 13 are provided for receiving rejected eggs. Driven in synchronism with the conveyor, as by shaft 11, for example, are three cams, 14, 15 and 16. These cams operate switches SW-1, SW-2, and a transfer device TR, respectively. An egg rejector, indicated diagrammatically at 17, is also provided, and the aforesaid Mumma patent shows in detail means suitable for this purpose. A suitable memory device M is also shown and described with reference to FIGURES 84 to 100b of the Mumma patent. Details of the memory device itself are not part of this invention.

THE OPTICAL SYSTEM

The optical system, indicated generally at B, includes a rotary, drum-like light chopper 20 driven by a synchronous motor 21 at 3600 r.p.m. The light chopper is formed with twenty-one openings or windows 22 spaced from one another by a distance equal to the circumferential width of the openings, as indicated at 23. A broad-beam spectrum lamp light source is provided by an ordinary projection lamp 24, that directs light to diametrically opposed intensifying lenses 26 and 26a. The lamp 24 and the lenses 26 and 26a are mounted on a platform 28 suspended from the frame of the apparatus by straps 29. The frame and the connection of the platform 28 to the frame are mere mechanical details, and are not shown for clarity. Light concentrated by the lenses 26 and 26a is passed through narrow slits in stationary diaphragm members 31 and 31a. It will be noted that since the number of windows 22 is odd, and since they are uniformly spaced around the chopper 20, the windows are alternately presented to the light beam on diametrically opposed sides of the chopper, and the blank portions between the windows are likewise alternately presented on diametrically opposite sides of the chopper. Thus, the beams of light emanating from lamp 24 are chopped by the chopper and emerge as bursts of light that are received by collimating lenses 32 and 32a, respectively. The direction of the collimated light emanating from lenses 32 and 32a is changed by mirrors 33, 33a, 34 and 34a placed at such an angle to cause the beams to converge. The beam of light B1 at the left in the diagram of FIGURE 1 will be considered to be the "reference beam," and it passes through an adjustable dimming gate 35, a known construction in the optical art so arranged that the angle of the dimming gate to the beam determines the intensity of the light transmitted. The right-hand beam of light B2 in FIGURE 1 is converted to a beam that is strongly absorbed by blood spots in the egg, by means of a filter 36. The filter restricts the wave length to a narrow band at 575 millimicrons, such a beam being termed a hemoglobin beam. Member 37, at which the two light beams converge, is a combined filter and mirror. It acts as a filter for the left-hand, or reference light beam B1, restricting its wave length to 597 millimicrons. This wave length has been found to be not only relatively uneffected by the presence of blood spots in the egg but is also relatively insensitive to variations in egg opacity and the effect of variations in shell and yoke color. The right-hand, or blood detection beam B2 of 575 millimicrons, sees the member 37 as a mirror, and most of the blood beam is reflected by member 37 to a mirror 38 that directs the beam through the egg and into the photomultiplier tube V8. Similarly, the left-hand or reference beam B1 strikes mirror 38 after passing through member 37, and is reflected along the same path through an egg under inspection. Thus, the photo-multiplier tube V8 receives alternate beams or bursts of light. One beam is a reference beam that is relatively insensitive to the presence of blood and to variations in egg opacity and color, and the other beam is a hemoglobin or blood sensitive beam, the wave length of which extends over a very narrow band at 575 millimicrons. This beam is strongly absorbed by hemoglobin such as blood spots in eggs. The optical system is arranged to direct the inspection beams in the direction of the long axis of the eggs under inspection.

Another element in the optical system B is the phototube or photocell V9, the operation of which will be explained in detail presently. The purpose of the photocell V9 is to synchronize or lock in the triggering signals with the signals derived from the photomultiplier tube V8. The photocell also receives bursts or beams of light B3 as the windows 22 of the chopper intercept the path between the lamp 24 and the photocell. Thus, as the chopper rotates at 3600 r.p.m., the alternate inspecting beams of light B1 and B2, as well as the beam of light B3 to the photocell, emerge as light bursts having a frequency of 1260 bursts per second, but the inspection beams are received by the photomultiplier tube V8 in the form of a series of bursts having a frequency of 2520 bursts per second since this tube receives both beams B1 and B2. In a typical operation, the conveyor 10 will transport eggs past the inspection station (the photomultiplier tube) at the rate of 330 eggs per minute or 19,800 eggs per hour. Even at this relatively high inspection rate, the system is found to be very reliable.

THE CONTROL CIRCUIT

Figure 2:
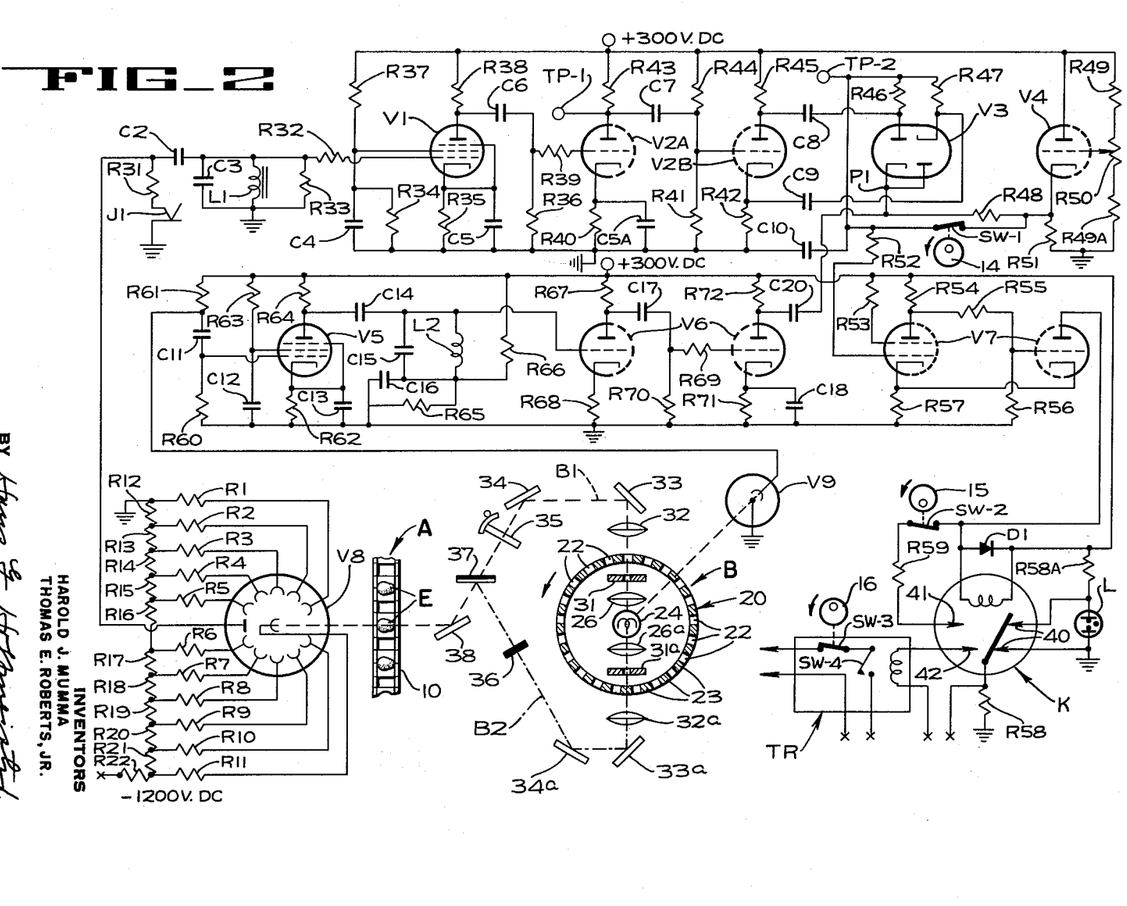
FIGURE 2 is a schematic diagram of the electrical control system.

Referring to the circuit diagram of FIGURE 2, the photomultiplier tube V8 has its various dynodes connected to current-limiting resistors R1 to R11, respectively, and the dynodes are supplied wtih progressively higher voltages through a string of voltage dividing resistors R12 to R22, respectively. The cathode is connected to a high-potential source of negative voltage at about minus 1200 volts D.C. The signal output of the photomultiplier, which converts the 2520 light bursts per second into 2520 voltage pulses per second, is applied across the load resistor R31 and a jack J1 to ground. The signal passes through a narrow-pass filter including an inductance L1 and a condenser C3, there also being a resistor R33, to give the desired small width band pass. This filter is tuned to resonate at a frequency of 1260 cycles, which is just half the frequency of the signals supplied by the photomultiplier tube. The filtered signals are amplified in tubes V1 and V2A that form conventional voltage amplifiers, details of which are not important to the invention. The amplified signals then pass to a phase inverter tube V2B, which is the other half of a double triode, the first half being the amplifier section V2A. The phase inverter V2B is a conventional cathode follower split-load circuit and supplies, by means of coupling condensers C8 and C9, amplified signals of opposite phase to a phase-sensitive rectifier tube in the form of a double diode V3. The circuit components for the elements just described are given in Table I, below.

*Table I*

[P.M. tube, tuner, amp., and phase inverter]

| | |
|---|---|
| R1–R11 | 8.2M. |
| R12–R22, R39 | 1M. |
| R31 | 820K. |
| R32 | 2.2M. |
| R33, R38 | 56K. |
| R34 | 150K. |
| R35, R40 | 1K. |
| R36 | 390K. |
| R37 | 100K. |
| R41 | 560K. |
| R42, R43, R45 | 22K. |
| R44 | 1.8M. |
| C2, C6 | .05 mf. |
| C3 | .01 mf. |
| C4 | .1 mf. |
| C5, C5A | 10 mf., 25 v. |
| C7 | .02 mf. |
| C8, C9 | .005 mf. |
| J–1 | Normally closed jack. |
| TP–1, TP–2 | Test points. |
| L–1 | Choke, 1 henry. |
| V1 | Type 6CB6. |
| V2A—V2B | Type 12AU7. |
| V8 | Type 6217 photomultiplier. |
| V9 | Type 925 phototube. |

It will be noted that the elements of the double diode V3 are reversely connected, in that the signal from the plate of the phase inverter V2B goes to the plate of one diode whereas the other signal, coming from the cathode of the phase inverter, goes to the cathode of the other diode. The other cathode and other plate are connected together at P1 and receive a positive reference voltage through R48 from the cathode of a cathode follower tube V4. The reference voltage is adjusted by the potentiometer R50 connected to the grid of the cathode follower tube.

The operation of reverse connected phase-sensitive rectifiers, such as double diode V3, is well known in the art, and a detailed description thereof is not believed necessary. It will be noted, however, that the load resistors R46 and R47, connected to the signal receiving plate and signal receiving cathode of V3, are of equal value and that both connect to an integrating capacitor C10, referenced to ground.

At this point it will be noted that switch SW-1 and cam 14 connect the cathode of the cathode follower V4 to the integrating capacitor C10. The switch is normally closed, and thus applies a reference voltage from the cathode follower directly to the capacitor C10, and charges it to that valtage. When the cam 14 opens the switch, the reference voltage is disconnected from condenser C10, which condenser is now responsive to the conditions occuring in the phase sensitive rectifier tube V3. Changes in the charge of capacitor C10 are conducted by a resistor R52 to the pentode trigger section of a dual tube V7, connected to form a Schmitt trigger circuit. The plate of the trigger tube is connected by R55 to the grid of a triode section of the tube. Binary multivibrator circuits of this nature are well known in the art, reference may be made to Pulse Digital Circuits by J. Millman and H. Taub (1956), McGraw-Hill, New York City, for a description of their operation. It need only be said that when the positive reference voltage, applied to the grid of the pentode section of the Schmitt trigger circuit through resistor R52, has a certain positive value, which might be termed a "threshold" value, the pentode section conducts, thereby cutting off the triode section in a manner characteristic of these circuits. This is the normal state of the circuit. The circuit is adjusted, however, so that should the voltage on the grid of the pentode section become appreciably less positive—that is, should it drop below the threshold reference voltage—the pentode section will be cut off, thereby permitting the triode section to conduct and activate elements in the plate circuit thereof.

The purpose of switch SW-1 is to keep the capacitor C10, that controls the trigger tube section of V7, at reference voltage until just an instant before an egg is to be inspected. At this time the cam 14, driven in synchronism with the conveyor, as indicated in FIGURE 1, opens switch SW-1 and lets condenser C10 float in the circuit, so that it is now responsive to the conduction conditions that may occur in the phase sensitive rectifier tube V3.

The triode section of tube V7 in the Schmitt trigger circuit controls a reject relay K. The coil of the relay has a diode D1 connected thereacross in accordance with the usual practice. One side of the coil is connected to +300 volts D.C. and the other side to the plate of the triode section of the tube V7, so that when the triode section conducts, the relay is energized. A neon lamp is connected across a right-hand set of contacts 40 of the relay and is so grounded out when the relay is de-energized. When the relay is energized, indicating a bloody egg, the neon lamp L lights, receiving its energy through resistor R58a.

Means are provided to hold the relay closed momentarily on receipt of a reject signal. The movable contact of the relay is connected to ground through resistor R58. The upper left-hand fixed contact 41 is connected to 300 volts D.C. through the resistor R59, switch SW-2, and the coil of the relay, so that contact 41 serves as a holding contact that keeps the relay energized so long as the switch SW-2 is closed. Switch SW-2 is closed by cam 15 approximately fifteen milliseconds before switch SW-1 is opened by cam 14 to remove the reference voltage from condenser C10. Switch SW-2 stays closed long enough to hold the movable contact of the relay against the lower left contact 42 for a period of time long enough to insure that the reject signal will be transferred to the memory device.

Means are provided to insure that when the Schmitt trigger tube circuit energizes the relay K, indicating the presence of a bloody egg, the resulting signal is transferred to the memory device at exactly the right time, that is when the egg under inspection is at the position at which it is assumed to be by the setting of the memory device. This is accomplished by the transfer device TR, and the cam 16 that is driven in synchronism with the conveyor. When the relay K is energized, indicating a bloody egg, switch SW-4 closes, and is held closed for a period by SW-2 and cam 15. When switch SW-3 is closed the reject signal will be imparted to the memory device. Since switch SW-3 is controlled by cam 16, which is timed to close the switch when an egg is at a predetermined position at the inspection station, this insures synchronism of a reject signal actually made when an egg is at the inspection station, with the fixed setting of the memory device at another station. The circuit components just described appear in Table II, below.

Table II

[Phase-sensitive rectifier, cathode follower, Schmitt trigger tube and relay]

| | |
|---|---|
| R46, R47 | 2.7M, matched. |
| R48, R55 | 220K. |
| R49 | 68K. |
| R49A | 27K. |
| R56 | 100K. |
| R50 | 10K 2w Pot. |
| R51, R57 | 10K. |
| R52 | 1M. |
| R53 | 100 ohms. |
| R54 | 6.8K. |
| R58 | 1.5K. |
| R58A | 470K. |
| R59 | 20K. |
| C10 | 101 mf. |
| SW-1, SW-2 | Normally closed switch. |
| V3 | Type 6ALB. |
| V4 | Type 12AU7. |
| V7 | Type 6AN8. |
| D-1 | Diode. |

The photocell circuit will now be explained briefly. The purpose of this circuit is to provide a phase reference signal that is initially established relative to the phase, or sense of the signals resulting from the active light absorption changes as they are detected by the photomultiplier tube. Once this phase sense is established, it is maintained at a subsequent point in the circuit, namely at the phase sensitive rectifier. The electric pulses resulting from the chopped beams or bursts of light striking photocell V9 are connected to a conventional amplifier tube V5. The output of this tube is coupled by a condenser C14 to a tuned load which includes condenser C15, inductance L2, and resistance R66. These elements are tuned to resonance at 1260 cycles, which frequency is exactly one-half the frequency of pulses emitted by the photomultiplier tube V8. At this frequency the tuned load has a high impedance and passes on the corresponding signal to a double triode V6, which acts as a squaring (clipped amplifier) circuit for the signal. The output of the squaring circuit is applied by means of condenser C20 to those cathode and plate elements of the phase sensitive rectifier of detector tube V3 that are tied together at P1. However, these cathode and plate elements of the detector tube receive not only the square wave signal from the photocell, but also receive a positive reference voltage from the cathode follower tube V4 through resistor R48. The values of the components of the photocell circuit are given in Table III, below.

Table III.—Photocell Circuit

RESISTORS

| | |
|---|---|
| R60 | 1M |
| R61, R70 | 220K |
| R62, R71 | 1K |
| R63 | 100K |
| R64 | 56K |
| R65 | 15K |
| R66 | 270K |
| R67, R72 | 22K |
| R68 | 3.9K |
| R69 | 2.2M |

CONDENSERS

| | |
|---|---|
| C11, C15 | .01 mf. |
| C12 | .1 mf. |
| C13, C16, C18 | 10 mf, 25 v. |
| C14 | .5 mf. |
| C17, C20 | .05 mf. |

MISCELLANEOUS

| | |
|---|---|
| L2 | Choke, 1 henry. |
| V5 | Type 6CB6. |
| V6 | Type 12AU7. |

OPERATION OF THE SYSTEM

The operation of the circuit elements of FIGURE 2 will be explained in connection with the diagram of FIGURE 3, wherein the various wave forms entering and leaving the various circuits are illustrated. Referring to the wave forms in the upper left portion of the drawing, these are the pulses sent by the photomultiplier tube to the 1260-cycle filter. Curve 45 shows a set of pulses at 2520 cycles. These are direct-current pulses generated by the photomultiplier tube and represent the alternate bursts of light transmitted through the egg. The pulses drawn in dashed lines (the first and third pulse) represent voltages corresponding to the 575 millimicron hemoglobin-sensitive beam, and the pulses drawn in broken lines (the second and fourth pulse) represent the pulses of the reference beam. Curve 45 is the condition that exists when a so-called standard egg is being inspected. This is an egg that is free from blood spots and represents close to the maximum opacity to the reference beam that will be encountered in a batch of eggs. It will be noted that the pulses for the two beams are shown to be of equal height, and this can be obtained by adjusting gate 35 in the reference beam to bring the reference pulse height down to that of the other beam.

Curve 46b shows the pulses derived when a bloody egg is being inspected. Here the transmission of the hemoglobin beam through the egg falls rather sharply, and the voltage pulse from the photomultiplier tube for this beam drops correspondingly. However, the voltage pulse corresponding to the reference beam remains substantially unchanged, because the wave length of the reference beam (597 millimicrons) is carefully selected to have this characteristic. It is not differentially absorbed in the presence of hemoglobin, nor is its absorption decreased (transmission increased) when the eggs under inspection are clearer than standard. It can now be seen, as indicated by the solid sine-wave line superimposed on curve 46b, that the pulses have an alternating current component, the frequency of which is half the frequency of the pulses themselves—that is, the alternating component has a frequency of 1260 cycles.

Curve 46c indicates the condition that occurs when the egg under inspection is considerably clearer than the standard egg. Under these circumstances (assuming the egg not to have a blood spot), the hemoglobin band is absorbed to a lesser degree than before, and the pulses resulting from the photomultiplier tube corresponding to the hemoglobin band are now of greater amplitude than those resulting from the standard egg shown in curve 45. As in the case of the bloody egg, the pulses resulting from the reference beam remain virtually unchanged in amplitude. Again, an alternating component at half frequency can be seen, indicated by the dashed lines on curve 46c. However, the phase of the alternating component for clear eggs is displaced 180° from the phase of the alternating component represented by a bloody egg.

If eggs that are more opaque than the standard egg are inspected, the transmission of both beams will drop, the beam for the blood band dropping somewhat more than that for the reference beam. This gives a signal having an alternating component that is in phase with the bloody egg signal and one might expect that all of such eggs would be rejected. However, it will be remembered that the standard egg for which the machine was adjusted was an egg of high opacity, so that few eggs inspected will be more opaque than standard, and if they are, the difference will not be large. Thus the pseudo-bloody egg signal that results will be small, and the apparatus is adjusted so as not to respond to signals of this small magnitude. When standard eggs, or those clearer than standard are under inspection, and contain blood spots, the differential absorption between the beams is much more marked, and the resulting signal is of a magnitude great enough to trigger the reject mechanism.

Curve 47b shows an alternating electric signal for a bloody egg that emerges from the 1260-cycle filter. This signal is now referenced above and below a zero voltage line. Curve 47c shows a corresponding signal for an exceptionally clear egg, which signal is 180° out of phase with the signal for a bloody egg. Curves 48b and 48c show the bloody and clear egg signals eafter amplification in the amplifier tubes V1, V2A and as applied to the phase inverter V2B. Curves 49b and 49c show the bloody and clear egg signals derived from one side of the phase inverter as signals applied to one side of the phase-sensitive rectifier tube V3. It is noted that these signals are 180° out of phase from the corresponding signals entering the phase inverter. As seen in FIGURE 2, these signals go to the plate of the left section of double diode V3 forming the phase sensitive rectifier.

Curves 50b and 50c represent the other outputs of the phase inverter, namely, the signals for bloody eggs and those for clear eggs, respectively. It will be noted that the two sets of signals for bloody eggs (curves 49b and 50b) supplied to the double diode V3 are out of phase by 180°, and that the two sets of clear egg signals (49c and 50c) are likewise out of phase by 180°. As seen in FIG. 2 the signals of curves 50b and 50c are applied to the cathode of the right section of double diode V3. It is to be understood that only bloody egg signals (49b, 50b) or clear egg signals (49c, 50c) are applied to the double diode V3 for any given egg.

Figure 3:
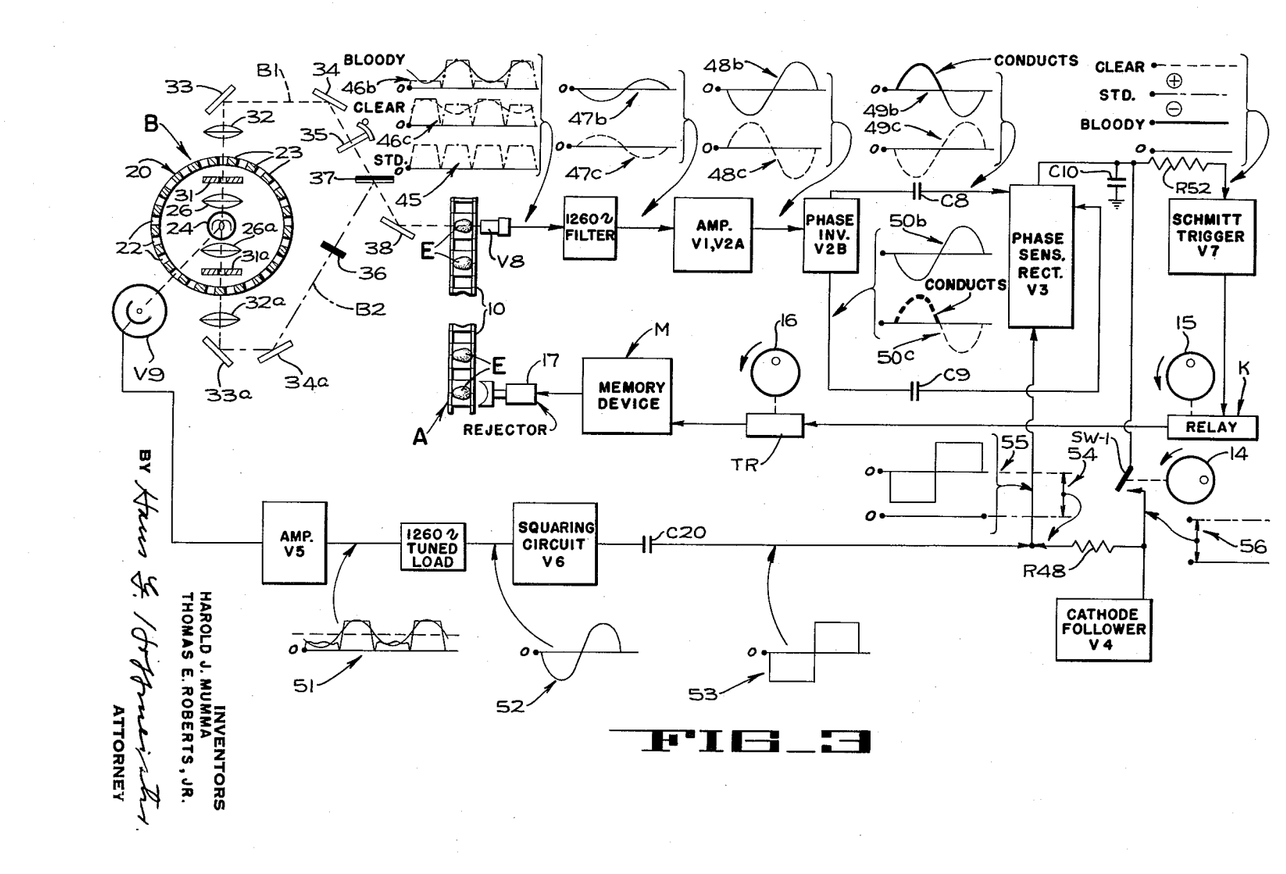
FIGURE 3 is a block diagram of the optical and electric control system with auxiliary views showing the wave forms involved in the control circuit, as the signals pass from one control element to the other.

Returning to the photocell circuit, as indicated in FIG. 3, the input from the photocell V9 goes to the amplifier V5 that receives and amplifies the electric pulses derived from the bursts of light entering the photocell. These electric pulses are alternated with unavoidable low-amplitude noise pulses, as indicated in curve 51, but even so, a clear 1260-cycle alternating signal component is provided by the photocell pulses. All frequencies other than the 1260-cycle component are bypassed by the tuned load including inductance L2. The tuned load presents a high impedance to the 1260-cycle alternating component of the photocell signals, and therefore presents this component as a signal that alternates relative to zero voltage to the squaring circuit V6, as indicated in curve 52. Curve 53 illustrates the square wave output of the squaring circuit V6, which is presented by coupling capacitor C20 to the phase-sensitive rectifier V3. Before entering the phase-sensitive rectifier, the square wave triggering pulse of curve 53 is combined with a direct-current reference voltage 54 generated in the cathode follower tube V4, and applied by means of resistor R48. This produces a resultant triggering voltage indicated by curve 55, which triggering voltage is a square wave displaced above ground by the reference voltage 54. The reference voltage from the cathode follower V4 is indicated in curve 56. This voltage is adjusted so that when it is applied to the pentode grid of tube V7 of the Schmitt trigger circuit through switch SW-1, the left hand or pentode section of the tube conducts, but a small decrease in the positive voltage applied to the grid of the pentode section of the tube will cause the tube to be cut off, with which the triode section conducts.

For convenience in understanding, the triggering voltage of curve 55 has been drawn in vertical alignment with the alternating current signals from the phase inverter, and there are four possible conditions, when the inspection signals are compared with trigger signals. Two of these conditions are the paired signals (49b, 50b) from bloody eggs that are 180° out of phase with respect to one another. The other two conditions are the paired signals (49c, 50c) from clear eggs, which are likewise 180° out of phase with respect to one another. In accordance with known principles of phase sensitive rectifier operation, only one of the two signals resulting from a bloody egg will cause conduction in the rectifier double diode V3, and this occurs during only one-half cycle and in only one of the diodes of the double diode V3. In this case, the left side of the diode will conduct on the first half-cycle for bloody eggs, as indicated in curve 49b, and the right side of the diode will conduct on the first half-cycle for clear eggs, as indicated in the curve 50c.

It will be remembered that signals for bloody and clear eggs are never supplied at the same time, so that there can exist one of the conduction conditions indicated in the diagram. Either one side or the other side of the phase-sensitive rectifier (double diode V3) conducts, in response to the trigger voltage 55, as applied to the wave form arrangements illustrated.

As can be seen from FIGURE 2, when the left diode of the phase-sensitive rectifier V3 conducts, as indicated in curve 49b of FIG. 3 (indicating a bloody egg) the electron flow through the left diode is in such a direction as to charge coupling capacitor C8 more negatively. During the next three half-cycles the diode is cut off, in accordance with well known principles. During cut off, part of the positive charge on the plate of integrating capacitor C10 bleeds through plate load resistor R46 to coupling condenser C8. This reduces the positive reference voltage charge on condenser C10 formerly applied through resistor R52 and switch SW-1. This reduction in charge appears at the grid of the pentode section of the Schmitt trigger tube. This section of the tube has been conducting because its grid was at the threshold positive reference voltage, which voltage is somewhat above the cut off point, but upon reduction of the grid potential this section is cut off. The right-hand or triode section of the Schmitt trigger tube can now conduct and operate the relay K, indicating a bloody egg.

When standard eggs are being inspected, the pulses are all equal, as indicated in curve 45, and there is no alternating component signal. Under these conditions the double diode V3 does not conduct because the square wave trigger voltage of curve 55 is not high enough to, in itself, cause conduction during either half-cycle. Thus the voltage on the grid of the pentode section of tube V7 remains at reference voltage during inspection, the pentode remains in its conducting state, and the relay K is not energized.

When a non-bloody egg, that is clearer than the standard egg, is under inspection, as indicated by curves 46c to 50c, alternating-current signals will be produced, but these are of opposite phase from those resulting from bloody eggs. As mentioned, the phase reversal occurs because with clear eggs, the hemoglobin band absorption is reduced, while the absorption of the reference beam is not materially changed. Under these conditions, it is the right-hand section of the phase-sensitive rectifier or double diode V3 that conducts. As indicated in FIG. 2, since the elements of the two diode sections of tube V3 are reverse-connected, conduction in the right hand section takes place in a direction opposite to that of conduction in the left hand section resulting from inspection of a bloody egg. Electron flow from the cathode to the plate of the right-hand diode section of the double diode V3 charges condenser C9 more positively than before, so that when the right diode section is cut off (as it will be during the next three half-cycles) the integrating capacitor C10 will be charged more positively. As a result a correspondingly more positive signal will be applied to the grid of the pentode section of the Schmitt trigger tube V7. This merely insures that the pentode section of V7 will continue conducting, and that the triode section will remain cut off, so that there is no danger of applying a reject signal to the reject relay, regardless of how clear the egg under inspection may be.

The amplitude of the alternating-current component for clear eggs has been exaggerated in figures 46c–50c for purposes of illustration. In actual service, the amplitude of the clear egg signal is substantially less than that of the bloody egg signal. As previously mentioned, there is an alternating-current component in the pulses received when eggs that are darker than the standard egg are inspected, which signal (not illustrated) is in phase with the bloody egg signal. However, since the standard egg itself has a relatively high opacity, this seldom occurs, and if it does the amplitude of such a signal will not be great enough to permit the square wave trigger voltage from the photocell circuit to initiate conduction of the left-hand diode of the phase sensitive rectifier tube V3. Even if such conduction were initiated, it would be so small that integrating condenser C10 would not be discharged below the positive threshold voltage required to hold the pentode section of the Schmitt trigger tube V7 in its conducting state. Careful selection of the filters (575 millimicrons and 597 millimicrons) make this action possible and render the device reliable even when inspecting relatively opaque eggs.

It can be seen that the system is precisely timed both as to application of the reject signal to the memory device, through timing cam 16, and as to the phase relationship of the triggering circuit signals (phototube) with the alternating-current signals produced from inspection of the eggs (both signals emanate from the same light chopper).

SUMMARY OF OPERATION

The operation of the apparatus will now be briefly summarized, especially with reference to FIGURE 3. The eggs are alternately inspected with bursts of light that include a reference band that is insensitive to hemoglobin and to color and opacity variations, and a hemoglobin band that is strongly absorbed by blood spots. In case a bloody egg is under inspection, the photo-multiplier tube receiving the bursts of light passing through the egg, convert the chopped beams of light into direct-current pulses having an alternating-current component of one phase. In case a standard egg (non-bloody) is being inspected, the pulses are of equal height, having no alternating component. If the egg under inspection is clear and not bloody, the pulses are of unequal height, but the alternating-current component is of relatively small amplitude, and is opposite in phase to the bloody egg component. The alternating components for the few eggs that are more opaque than the standard egg are too small to be of significance. These alternating components for bloody and dark, or for clear eggs, as the case may be, are filtered by the 1260-cycle filter to provide alternating-current voltages that vary above and below a zero voltage reference line. The voltages are amplified in tubes V1, V2a and applied by a phase inverter tube V2b to opposite sides of reverse-connected double diode V3 serving as a phase-sensitive rectifier.

The same light chopper that produces the inspection beams or bursts of light also presents bursts of light to a photocell or phototube V9, which produces alternate pulse voltages representing the bursts of light, with some incidental and unwanted noise pulse voltages of low amplitude disposed therebetween. These pulses are amplified in amplifier V5 and the 1260-cycle alternating-current component thereof is detected by the 1260-cycle tuned load filter, and applied as an alternating-current voltage signal (referenced to ground) to the squaring circuit tube V6.

The squaring circuit tube converts the phototube signals into a square wave that is combined with a reference voltage produced by the cathode follower V4, and presented to the phase-sensitive rectifier V3. Between inspections, the cam 14, synchronized with the conveyor, has permitted switch SW-1 to close and has charged the integrating capacitor C10 to the reference voltage supplied by the cathode follower V4. A few microseconds before inspection, the cam 14 opens switch SW-1 and floats the integrating capacitor C10 on the output circuit of the phase-sensitive rectifier V3.

When the trigger voltage in the photocell circuit is applied to the alternating-current signals from the inspection circuit (if any), the phase-sensitive rectifier conducts in one direction or the other, depending upon whether a bloody egg signal is received or whether a clear egg signal is received. There is little or no conduction for eggs of standard color or darker. The conduction that results from a bloody egg signal is in such a direction as to lower the charge on integrating capacitor C10, which lowered potential is applied to the normally conducting section Schmitt trigger tube causing it to cut off. Now the triode element of the trigger tube connected to the relay K, actuates the relay, indicating the presence of a bloody egg.

The relay is automatically locked in position for a short length of time by cam 15, synchronized with the conveyor, which cam permits switch SW-2 to close and thus hold the relay locked in its reject position for a time long enough to actuate the memory circuit. The signal from the relay goes to the transfer relay TR which passes the signal on to the memory device and, hence, to the egg rejecter. This occurs only when the cam 16 closes a switch SW-3 (FIG. 2) in the transfer device to transfer the reject signal through the relay closed switch SW-4 (FIG. 2) to the memory device. Cam 16 is precisely timed so that the memory device will act upon the egg that was under inspection at the exact time that it reaches the rejecter 17. After inspection, the relay K is unlocked by cam 15, the reference voltage is again applied to the condenser C10 by cam 14, and cam 16 for the transfer device TR disconnects the memory device from the circuit.

The rotational speed of the chopper 20 and the conveyor speed is such that an egg is inspected by about twenty bursts of light while it is passing in front of the photomultiplier tube V8. Thus the condenser C10 has time to integrate a number of these conduction signals one way or the other, which improves the reliability of the entire circuit.

ADJUSTMENT

The optical elements are first mechanically aligned to center the inspection beams on the egg. The adjustment of the electrical elements of the device should be obvious to those skilled in the art because the elements going to make up the entire control circuit are in and of themselves largely well known circuit components. As mentioned, a standard or reference egg is used for adjustment of the relative intensities of the inspection beams of the optical system. To make this adjustment, an oscilloscope is connected to test point TP–1 (FIG. 2), and the mechanical light gate 35 is adjusted to produce a minimum voltage signal at this test point. After this adjustment is made, the synchronism of the photocell is checked by removing the cathode follower tube V4 from the circuit and inserting a meter at test point TP–2. The photocell should be positioned so that the voltage at this point is zero. The cathode follower tube V4 is then reinserted and the grid bias potentiometer R50 is adjusted to produce the desired reference voltage at TP–2, which voltage will be in the neighborhood of 90 volts for the circuit components given in the tables. A bloody egg is substituted for the reference egg, which should now cause the voltage at TP–2 to become more negative than before, which voltage should be negative enough to cause the Schmitt trigger tube to switch conduction states.

The function of the cams 14, 15 and 16 has been explained and adjustment thereof is a mere mechanical procedure. Cam 14 is adjusted to open its reference voltage switch SW–1 when the egg is centered in the inspection beam. Opening of this switch removes the reference voltage from the capacitor C10, and places the capacitor in the rectifier output circuit, so that it can be affected by the egg signal level. Relay holding cam 15 is adjusted so that it closes relay lock switch SW-2 approximately fifteen milliseconds before cam 14 opens reference voltage switch SW-1, and opens the relay lock switch approximately fifty milliseconds after reference voltage switch SW-1 is again closed. Switch SW-2 holds the relay K in its reject position long enough to apply a signal to the memory device. Timing cam 16 at the transfer device TR is adjusted so that the signal is transferred by switch SW-3 to the memory device at the proper time for the rejector to reject the egg under inspection, in case it is bloody.

Thus it can be seen that the apparatus in the invention can inspect eggs reliably and very rapidly. It is not affected by variations in opacity and yolk or shell color, and does not rely upon perfection in the filters involved. The provision of the phototube triggering circuit working with the light chopper makes the device independent of slight variations in the speed with which the chopper is driven, so long as these variations do not exceed the range of the tuned circuits in the control system.

The nature of the optical system makes possible the use of a single light source and synchronizes the trigger voltage with the signal.

The reference voltage cam stabilizes and restores the system between inspections and insures that the free state of the integrating capacitor is always the same when inspection begins.

The timing cam insures that a reject signal will always be transferred to the memory device when the egg under inspection is in the position for which the memory device is adjusted.

The invention having thus been described what is claimed and desired to be protected by Letters Patent is:

1. The method for inspecting eggs for the presence of blood comprising the steps of alternately passing through an egg under inspection a first beam of light that is not selectively absorbed by blood and a second beam of light of a wave length that is selectively absorbed by blood, converting the intensity of the beams of light that emerge alternately from the egg into corresponding alternate electric pulse signals whose amplitudes are a function of the intensity of the light of each of said beams transmitted by the egg, converting any amplitude differences between said pulse signals that may occur into a single alternating electric signal having a frequency that is one-half the frequency of said pulse signals, the phase of any alternating electric signals that may be derived from a clear egg being displaced from those derived from a bloody egg by 180°, and using the alternating electric signal derived from a bloody egg for control of an egg reject circuit.

2. The method for inspecting eggs for the presence of blood comprising the steps of alternately passing through continuously moving eggs under inspection a first beam of light that is not selectively absorbed by blood and a second beam of light of a wave length that is selectively absorbed by blood, converting the intensity of the beams of light that emerge alternately from the egg into corresponding alternate electric pulse signals whose amplitudes are a function of the intensity of the light of each of said beams transmitted by the egg, converting any amplitude differences between said pulse signals that may occur into a single alternating electric signal having a frequency that is one-half the frequency of said pulse signals, the phase of any alternating electric signals that may be derived from a clear egg being displaced from those derived from a bloody egg by 180°, using the alternating electric signal derived from a bloody egg supplying a reject pulse to an egg reject circuit, and transferring said reject pulse to a memory circuit in synchronized relation to the motion of bloody eggs under inspection.

3. The method for inspecting eggs for the presence of blood comprising the steps of continuously passing eggs past an inspection station, alternately passing through an egg under inspection a first beam of light that is not selectively absorbed by blood and a second beam of light of a wave length that is selectively absorbed by blood, converting the intensity of the beams of light that emerge alternately from the egg into corresponding alternate electric pulse signals whose amplitudes are a function of the intensity of the light of each of said beams transmitted by the egg, converting any amplitude differences between said pulse signals that may occur into a single alternating electric signal having a frequency that is one-half the frequency of said pulse signals, the phase of any alternating electric signals that may be derived from a clear egg being displaced from those derived from a bloody egg by 180°, supplying pulses that are in phase with one of said alternating electric signals, combining said pulses and alternating electric signals to produce a trigger signal for a two-way rectifier, and using the rectified electric signal derived from a bloody egg for control of an egg reject circuit.

4. The method for inspecting eggs for the presence of blood comprising the steps of alternately passing through an egg under inspection a first beam of light that is not selectively absorbed by blood and a second beam of light of a wave length that is selectively absorbed by blood, converting the intensity of the beams of light that emerge alternately from the egg into corresponding alternate electric pulse signals whose amplitudes are a function of the intensity of the light of each of said beams transmitted by the egg, converting any amplitude differences between said pulse signals that may occur into a single alternating electric signal having a frequency that is one-half the frequency of said pulse signals, the phase of any alternating electric signals that may be derived from a clear egg being displaced from those derived from a bloody egg by 180°, rectifying said derived alternating electric signals, and sensing the rectified electric signal derived from a bloody egg for control of a reject circuit.

5. The method for inspecting eggs for the presence of blood comprising the steps of alternately passing through an egg under inspection chopped beams of light consisting of a first beam of light that is not selectively absorbed by blood and a second beam of light of a wave length that is selectively absorbed by blood, converting the intensity of the beams of light that emerge alternately from the egg into corresponding alternate electric pulse signals whose amplitudes are a function of the intensity of the light of each of said beams transmitted by the egg, converting any amplitude differences between said pulse signals that may occur into a single alternating electric signal having a frequency that is one-half the frequency of said pulse signals, the phase of any alternating electric signals that may be derived from a clear egg being displaced from those derived from a bloody egg by 180°, deriving an alternating square wave signal from a photocell that receives chopped beams of light at the same time that one of said inspecting beams passes through the egg combining said square wave with said alternating electric signals to produce direct-current pulses that flow in one direction for a clear egg and in the opposite direction for a bloody egg, and using the direct-current pulses.

6. The method of inspecting eggs for the presence of blood comprising the steps of alternately passing through an egg under inspection a first beam of light that is not selectively absorbed by blood and a second beam of light of a wave length that is selectively absorbed by blood, converting the intensity of the beams of light that emerge alternately from the egg into corresponding alternate electric pulse signals, the amplitudes of said signals being the function of the intensity of the light of each of said beams transmitted by the egg converting any amplitude differences between said pulse signals that may occur into a single alternating electric signal having a frequency that is one-half the frequency of said pulse signals, the phase of any alternating electric signals that may be derived from a clear egg being displaced from those derived from a bloody egg by 180°, providing an alternating square wave of a frequency exactly equal to and in-phase with one of said alternating electric signals, comparing said square wave with said alternating electric signals, rectifying the signal resulting from said comparison to provide direct-current pulses with the direct-current pulses for a bloody egg flowing oppositely from those for a clear egg, and sensing the rectified electric pulses derived from a bloody egg for control of a reject circuit.

7. The method for inspecting eggs for the presence of blood comprising the steps of continuously passing eggs past a phototube, providing a broad spectrum light source, mechanically chopping the light emanating from said source into alternately produced beams, filtering the beams to provide a first beam of light that is not selectively absorbed by blood and a second beam of light of a wave length that is selectively absorbed by blood, passing said chopped and filtered beams alternately through a moving egg and into the phototube for converting the intensity of the beams of light that emerge alternately from the egg into corresponding alternate electric pulse signals, the amplitudes of said signals being a function of the intensity of the light of each of said beams transmitted by the egg, converting any amplitude differences between said pulse signals that may occur into a single alternating electric signal having a frequency that is one-half the frequency of said pulse signals, the phase of any alternating electric signals that may be derived from a clear egg being displaced from those derived from a bloody egg by 180°, rectifying said derived alternating electric signals and sensing the rectified electric signal derived from a bloody egg for control of a reject circuit.

8. The method for inspecting eggs for the presence of blood comprising the steps of continuously passing eggs past a phototube, providing a light source, mechanically chopping the light emanating from said source into alternately produced means, filtering the beams to provide a first beam of light that is not selectively absorbed by blood and a second beam of light of a wave length that is selectively absorbed by blood, passing said chopped and filtered beams alternately through a moving egg and into the phototube for converting the intensity of the beams of light that emerge alternately from the egg into corresponding alternate electric pulse signals, the amplitudes of said signals being a function of the intensity of the light of each of said beams transmitted by the egg, converting any amplitude differences between said pulse signals that may occur into a single alternating electric signal having a frequency that is one-half the frequency of said pulse signals, the phase of any alternating electric signals that may be derived from a clear egg being displaced from those derived from a bloody egg by 180°, directing a chopped beam of light directly into a photocell to provide an alternating square wave electric signal of a frequency exactly equal to and in phase with one of said alternating electric signals, comparing said square wave with said alternating electric signals, rectifying the signal resulting from said comparison to provide direct-current pulses for a bloody egg that flow oppositely from those for a clear egg, and sensing the rectified electric pulses derived from a bloody egg for control of a reject circuit.

9. Apparatus for detecting the presence of blood in eggs comprising a light source means, a mechanically driven light chopper for receiving light beams from said source and alternately producing two beams of light of short duration, a filter for one of said beams for converting it into a reference beam that is not selectively absorbed by blood, a filter for the other beam for converting it into a beam of a wave length that is selectively absorbed by blood, optical means for passing said filtered beams through an egg, a phototube for converting said chopped and filtered beams into corresponding direct-current pulses, tuned circuit means for converting any amplitude differences between said pulse into an alternating electric signal having a frequency that is one-half the frequency of said pulses, the phase of any alternating electric signals that may be derived from a clear egg being displaced from those derived from a bloody egg by 180°, means for rectifying said derived alternating electric signals, an egg reject circuit, and means connected to said reject circuit for sensing the rectified electric signal derived from a bloody egg for control of said egg reject circuit.

10. Apparatus for detecting the presence of blood in eggs comprising conveyor means for continuously moving eggs past an inspection station, light source means, a light chopper receiving light beams from said source, means for driving said chopper in synchronism with said conveyor means for alternately producing two beams of light of short duration, a filter for one of said beams for converting it into a reference beam that is not selectively absorbed by blood, a filter for the other beam for converting it into a beam of a wave length that is selectively absorbed by blood, optical means for passing said filtered beams through an egg, a phototube at said inspection station for converting said chopped and filtered beams into corresponding direct-current pulses, tuned circuit means for converting any amplitude differences between said pulses into an alternating electric signal having a frequency that is one-half the frequency of said pulses, the phase of any alternating electric signal that may be derived from a clear egg being displaced from those derived from a bloody egg by 180°, a photocell for receiving a beam of light from said chopper, means for converting the electric pulses from said photocell into alternating square waves, means for combining said derived alternating electric signals with said square waves to produce direct-current pulses that flow in one direction for a bloody egg and in the opposite direction for a clear egg, an egg reject circuit, and a trigger circuit connected to said combining means, the conduction of said trigger circuit being unaffected by direct-current pulses resulting from inspection of a clear egg, the conduction of said trigger circuit being reversed in response to direct-current pulses resulting from inspection of a bloody egg, said trigger circuit being connected to said egg reject circuit for rejecting bloody eggs.

11. Apparatus for detecting the presence of blood in eggs comprising conveyor means for continuously moving eggs past an inspection station, light source means, a light chopper receiving light beams from said source, means for driving said chopper in synchronism with said conveyor means for alternately producing two beams of light of short duration, a filter for one of said beams for converting it into a reference beam that is not selectively absorbed by blood, a filter for the other beam for converting it into a beam of a wave length that is selectively absorbed by blood, optical means for passing said filtered beams through an egg, a phototube at said inspection station for converting said chopped and filtered beams into corresponding direct-current pulses, tuned circuit means for converting any amplitude differences between said pulses into an alternating electric signal having a frequency that is one-half the frequency of said pulses, the phase of any alternating electric signals that may be derived from a clear egg being displaced from those derived from a bloody egg by 180°, a photocell for receiving a beam of light from said chopper, means for converting the electric pulses from said photocell into alternating square waves, means for combining said derived alternating electric signals with said square wave to produce direct-current pulses that flow in one direction for a bloody egg and in the opposite direction for a clear egg, a trigger circuit connected to said combining means, the conduction of said trigger circuit being unaffected by direct-current pulses resulting from inspection of a clear egg, the conduction of said trigger circuit being reversed in response to direct-current pulses resulting from inspection of a bloody egg, an egg reject circuit, said trigger circuit being connected to said egg reject circuit for rejecting bloody eggs, a memory device, and means in said egg reject circuit including a reject signal transfer switch driven in synchronism with said conveyor means for connecting egg reject signals to said memory device.

12. Apparatus for detecting the presence of blood in eggs comprising a light source, an inspection station, a phototube at said inspection station, conveyor means for continuously moving eggs past said inspection station, a light chopper receiving light beams from said source, means driving said light chopper in synchronism with said conveyor means for alternately producing two beams of light of short duration, a filter for one of said beams for converting it into a reference beam that is not selectively absorbed by blood, a filter for the other beam for converting it into a beam of a wave length that is selectively absorbed by blood, optical means for passing said filtered beams through an egg and into said phototube for converting said chopped and filtered beams into corresponding direct-current pulses, tuned circuit means for converting any amplitude differences between said pulses into an alternating electric signal having a frequency that is one-half the frequency of said pulses, the phase of any alternating electric signals that may be derived from a clear egg being displaced from those derived from a bloody egg by 180°, means for rectifying said derived alternating electric signals into direct-currents that flow in one direction for a bloody egg and in the opposite direction for a clear egg, an egg reject circuit, and means connected to said reject circuit for sensing the rectified electric signal derived from a bloody egg for control of said egg reject circuit.

13. Apparatus for detecting the presence of blood in eggs comprising a single broad spectrum light source, an inspection station, a photomultiplier tube at said inspection station, conveyor means for continuously moving eggs past said inspection station, a rotary light chopper receiving light beams from said source, means driving said light chopper in synchronism with said conveyor means for alternately producing beams of light of short duration, a filter for one of said beams for converting it into a reference beam of a wave length that is not selectively absorbed by blood, a filter for the other beam for converting it into a beam of a wave length that is selectively absorbed by blood, optical means for passing said filtered means through an egg and into said photomultiplier tube for converting said chopped and filtered beams into corresponding direct-current pulses, tuned circuit means for converting any amplitude differences between said pulses into an alternating electric signal having a frequency that is one-half the frequency of said pulses, the phase of any alternating electric signals that may be derived from a clear egg being displaced from that derived from a bloody egg by 180°, means for rectifying said derived alternating electric signals into direct currents that flow in one direction for a bloody egg and in the opposite direction for a clear egg, an egg reject circuit, and means in said reject circuit for sensing the rectified electric signal derived from a bloody egg for control of said egg reject circuit.

14. Apparatus for detecting the presence of blood in eggs comprising light source means, a chopper for receiving light beams from said source and alternately producing two beams of light of short duration, a filter for one of said beams for converting it into a reference beam that is not selectively absorbed by blood, a filter for the other beam for converting it into a beam of a wave length that is selectively absorbed by blood, optical means for passing said filtered beams through an egg, a phototube for converting said chopped and filtered beams into corresponding direct-current pulses, tuned circuit means for converting any amplitude differences between said pulses into an alternating electric signal having a frequency that is one-half the frequency of said pulses, the phase of any alternating electric signals that may be derived from a clear egg being displaced from those derived from a bloody egg by 180°, a photocell for receiving another chopped beam of light from said chopper and converting the beam into direct-current pulses synchronized with said alternating electric signals, means for converting said photocell pulses into an alternating square wave that is in phase with one of said alternating-current signals, means for comparing said square wave with said alternating electric signals, means for rectifying the signal resulting from said comparison, an egg reject circuit, and means connected to said reject circuit for sensing the rectified electric signal derived from a bloody egg for control of said egg reject circuit.

15. Apparatus for detecting the presence of blood in eggs comprising light source means, a chopper for receiving light beams from said source and alternately producing two beams of light of short duration, a filter for one of said beams for converting it into a reference beam that is not selectively absorbed by blood, a filter for the other beam for converting it into a beam of a wave length that is selectively absorbed by blood, optical means for passing said filtered beams through an egg, a phototube for converting said chopped and filtered beams into corresponding direct-current pulses, tuned circuit means for converting any amplitude differences between said pulses into an alternating electric signal having a frequency that is one-half the frequency of said pulses, the phase of any alternating electric signals that may be derived from a clear egg being displaced from those derived from a bloody egg by 180°, a photocell for receiving another chopped beam of light from said chopper and converting the beam into direct-current pulses synchronized with said alternating electric signals, means for converting said photocell pulses into an alternating square wave that is in phase with one of said alternating-current signals, means for comparing said square wave with said alternating electric signals, means for rectifying the signal resulting from said comparison, an egg reject circuit, and a trigger circuit connected to said reject circuit and responsive to the rectified electric signal derived from a bloody egg for actuating said egg reject circuit when a bloody egg signal is received.

16. Apparatus for detecting the presence of blood in eggs comprising light source means, a chopper for receiving light beams from said light source and alternately producing two beams of light of short duration, one of said beams being a reference beam that is not selectively absorbed by blood, the other beam of said beams being of a wave length that is selectively absorbed by blood, optical means for passing said beams through an egg, a phototube for converting said chopped beams into corresponding direct-current pulses, tuned circuit means for converting any amplitude differences between said pulses into an alternating electric signal having a frequency that is one-half the frequency of said pulses, the phase of any alternating electric signals that may be derived from a clear egg being displaced from those derived from a bloody egg by 180°, a phase inverter for said alternating electric signals, a double diode rectifier with the anode element of one diode and the cathode element of the other diode being connected respectively to the outputs of said phase inverter, means for applying electric pulses to both of the other elements of said diode, said pulses being in phase with one of said alternating electric signals, said diode producing a rectified direct-current that flows in one direction for a bloody egg and in the opposite direction for a clear egg, an egg reject circuit and means for sensing the rectified electric signal derived from a bloody egg for control of said egg reject circuit.

17. Apparatus for detecting the presence of blood in eggs comprising continuously driven conveyor means for carrying eggs past an inspection station, light source means, a chopper for receiving light beams from said source and alternately producing two beams of light of short duration, one of said beams being a reference beam that is not selectively absorbed by a blood, the other beam of said beams being of a wave length that is selectively absorbed by a blood, optical means for passing said beams through an egg, a phototube at said inspection station for converting said chopped beams into corresponding direct current pulses, tuned circuit means for converting any amplitude differences between said pulses into an alternatting electric signal having a frequency that is one half the frequency of said pulses, the phase of any alternating electric signals that may be derived from a clear egg being displaced from those derived from a bloody egg by 180°, a phase inverter for said alternating electric signals, a double diode rectifier with the anode element of one diode and the cathode element of the other diode being connected respectively to the outputs of said phase inverter, means for applying electric pulses to both of the other elements of said diode, said pulses being in phase with one of said alternating electric signals, said diode producing a rectified direct current that flows in one direction for a bloody egg and in the opposite direction for a clear egg, an egg reject circuit, means for sensing the rectified electric signal derived from a bloody egg for control of said egg reject circuit, said egg reject circuit including a reject relay connected to said sensing means and a reject signal transfer switch connected to said relay, a memory device, and means synchronized with said conveyor for closing said transfer switch for transferring reject signals to said memory device.

18. Apparatus for detecting the presence of blood in eggs comprising continuously driven conveyor means for carrying eggs past an inspection station, light source means, a chopper for receiving light beams from said source and alternatively producing two beams of light of short duration, one of said beams being a reference beam that is not selectively absorbed by blood, the other beam of said beams being of a wave length that is selectively absorbed by blood, optical means for passing said beams through an egg, a phototube at said inspection station for converting said chopped beams into corresponding direct-current pulses, tuned circuit means for converting any amplitude differences between said pulses into an alternating electric signal having a frequency that is one-half the frequency of said pulses, the phase of any alternating electric signals that may be derived from a clear egg being displaced from those derived from a bloody egg by 180°, a phase inverter for said alternating electric signals, a double diode rectifier with the anode element of one diode and the cathode element of the other diode being connected respectively to the outputs of said phase inverter, means for supplying electric pulses that are in phase with one of said alternating electric signals, means for supplying a reference voltage, means for combining said electric pulses and said reference voltage, means for applying the resulting pulse voltages to both of the other elements of said diode, said diode producing a rectified direct current that flows in one direction for a bloody egg and in the opposite direction for a clear egg, an egg reject circuit, means for sensing the rectified electric signal derived from a bloody egg for control of said egg reject circuit, said egg reject circuit including a reject relay connected to said sensing means and a reject signal transfer switch connected to said relay, a memory device, and means synchronized with said conveyor for closing said transfer switch for transferring reject signals to said memory device.

19. Apparatus for detecting the presence of blood in eggs comprising continuously driven conveyor means for carrying eggs past an inspection station, light source means, a chopper for alternately producing beams of light of short duration, one of said beams being a reference beam that is not selectively absorbed by blood, the other beam of said beams being of a wave length that is selectively absorbed by blood, optical means for passing said beams through an egg, a phototube at said inspection station for converting said chopped beams into corresponding direct-current pulses, tuned circuit means for converting any amplitude differences between said pulses into an alternating electric signal having a frequency that is one-half the frequency of said pulses, the phase of any alternating electric signals that may be derived from a clear egg being displaced from those derived from a bloody egg by 180°, a phase inverter for said alternating electric signals, a double diode rectifier with the anode element of one diode and the cathode element of the other diode being connected respectively to the outputs of said phase inverter, means for supplying electric pulses that are in phase with one of said alternating electric signals, means for supplying a reference voltage, means for combining said electric pulses and said reference voltage, means for applying the resulting pulse voltages to both of the other elements of said diode, said diode producing a rectified direct current that flows in one direction for a bloody egg and in the opposite direction for a clear egg, an egg reject circuit, a monostable multi-vibrator circuit for sensing the rectified electric signal derived from a bloody egg and converting it into a reject current for said egg reject circuit, means for applying a reference voltage to said multi-vibrator circuit for holding it in a state wherein no reject current can be produced, and means synchronized with said conveyor for removing said reference voltage from said multi-vibrator circuit during inspection of an egg.

20. Apparatus for detecting the presence of blood in eggs comprising continuously driven conveyor means for carrying eggs past an inspection station, light source means, a chopper for alternately producing beams of light of short duration, one of said beams being a reference beam that is not selectively absorbed by blood, the other beam of said beams being of a wave length that is selectively absorbed by blood, optical means for passing said beams through an egg, a phototube at said inspection station for converting said chopped beams into corresponding direct-current pulses, tuned circuit means for converting any amplitude differences between said pulses into an alternating electric signal having a frequency that is one-half the frequency of said pulses, the phase of any alternating electric signals that may be derived from a clear egg being displaced from those derived from a bloody egg by 180°, a phase inverter for said alternating electric signals, a double diode rectifier with the anode element of one diode and the cathode element of the other diode being connected respectively to the outputs of said phase inverter, means for supplying electric pulses that are in phase with one of said alternating electric signals, means for supplying a reference voltage, means for combining said electric pulses and said reference voltage, means for applying the resulting pulse voltages to both of the other elements of said diode, said diode producing a rectified direct-current that flows in one direction for a bloody egg and in the opposite direction for a clear egg, an egg reject circuit, a monostable multi-vibrator circuit for sensing the rectified electric signal derived from a bloody egg and converting it into a reject current for said egg reject circuit, means for applying a reference voltage to said multi-vibrator circuit for holding it in a state wherein no reject current is produced, and means synchronized with said conveyor for removing said reference voltage from said multi-vibrator circuit during inspection of an egg, said egg reject circuit including a reject relay connected to said sensing means, a reject signal transfer switch connected to said relay, and means synchronized with said conveyor for closing said transfer switch for transferring reject signals to a memory device.

21. Apparatus for detecting the presence of blood in eggs comprising a single light source, a rotary light chopper for alternately producing beams of light of short duration, a filter for one of said beams for converting it into a reference beam that is not selectively absorbed by blood, a filter for the other beam for converting it into a beam of wave length that is selectively absorbed by a blood, an inspection station, conveyor means for continuously carrying eggs past said station, optical means for passing said filtered beams through an egg at said station, a photomultiplier tube for converting said chopped and filtered beams into corresponding direct current pulses, tuned circuit means for converting any amplitude differences between said pulses into an alternating electric signal having a frequency that is one half the frequency of said pulses, the phase of an alternating electric signal that may be derived from a clear egg being displaced from those derived from a bloody egg by 180°, a phototube receiving light from said chopper, means for combining the output signals of said phototube with said alternating electric signals, means for rectifying said combined alternating electric signals, an egg reject circuit, control means for sensing the rectified electric signal derived from a bloody egg and supplying a control signal for control of said egg reject circuit, and switch means operated by said conveyor means for determining the time of application of a control signal to said reject circuit.

References Cited in the file of this patent

UNITED STATES PATENTS

| | | |
|---|---|---|
| 2,439,373 | Stearns | Apr. 6, 1948 |
| 2,823,800 | Bliss | Feb. 18, 1958 |